(12) United States Patent
Yazdy et al.

(10) Patent No.: US 6,256,710 B1
(45) Date of Patent: Jul. 3, 2001

(54) CACHE MANAGEMENT DURING CACHE INHIBITED TRANSACTIONS FOR INCREASING CACHE EFFICIENCY

(75) Inventors: Farid A. Yazdy, Belmont; Michael Dhuey, Cupertino, both of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 08/430,453

(22) Filed: Apr. 28, 1995

(51) Int. Cl.[7] ........................................ G06F 12/00
(52) U.S. Cl. ........................ 711/133; 711/139; 711/141
(58) Field of Search ................................. 395/465, 466, 395/468, 472; 711/138, 139, 141, 145, 133

(56) References Cited

U.S. PATENT DOCUMENTS

| | | | |
|---|---|---|---|
| 4,547,845 | 10/1985 | Ross | 710/109 |
| 4,817,037 | 3/1989 | Hoffman et al. | 710/110 |
| 4,896,256 | 1/1990 | Roberts | 710/129 |
| 5,073,851 | 12/1991 | Masterson et al. | 711/140 |
| 5,237,567 | 8/1993 | Nay et al. | 370/438 |
| 5,287,481 * | 2/1994 | Lin | 395/465 X |
| 5,297,270 * | 3/1994 | Olson | 395/466 X |
| 5,307,477 * | 4/1994 | Taylor et al. | 395/449 X |
| 5,347,648 | 9/1994 | Stamm et al. | 714/5 |
| 5,353,415 * | 10/1994 | Wolford et al. | 395/442 X |
| 5,353,429 | 10/1994 | Fitch | 711/167 |
| 5,355,467 | 10/1994 | MacWilliams et al. | 711/146 |
| 5,375,215 | 12/1994 | Hanawa et al. | 711/169 |
| 5,377,324 | 12/1994 | Kabemoto et al. | 711/148 |
| 5,408,636 * | 4/1995 | Santeler et al. | 395/468 X |

OTHER PUBLICATIONS

*PowerPC™ 601, RISC Microprocessor User's Manual*, Motorola Inc. 1993, pp. 6–16—6–17; 9–1—9–12; and 9–18—9–19.

\* cited by examiner

*Primary Examiner*—David L. Robertson
(74) *Attorney, Agent, or Firm*—Burns, Doane, Swecker & Mathis, L.L.P.

(57) ABSTRACT

Cache memory is managed to update the data stored in the cache regardless of whether the address being operated upon is designated as cache inhibited. In this way, the contents of the cache are coherent with main memory so that when the processor redesignates a noncacheable range of addresses to be cacheable, the cache does not need to be flushed. Read operations follow cache inhibit faithfully.

10 Claims, 4 Drawing Sheets

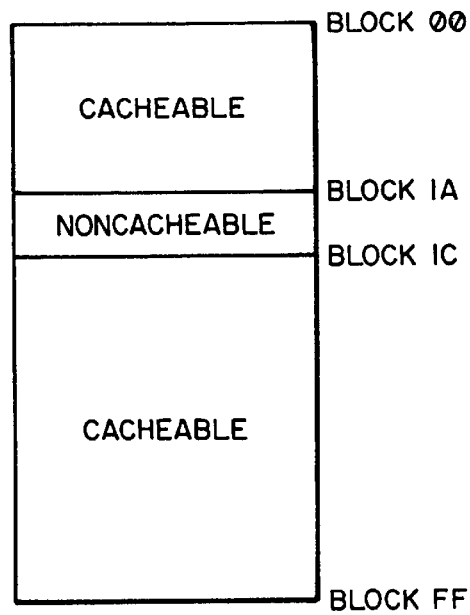
FIG_1
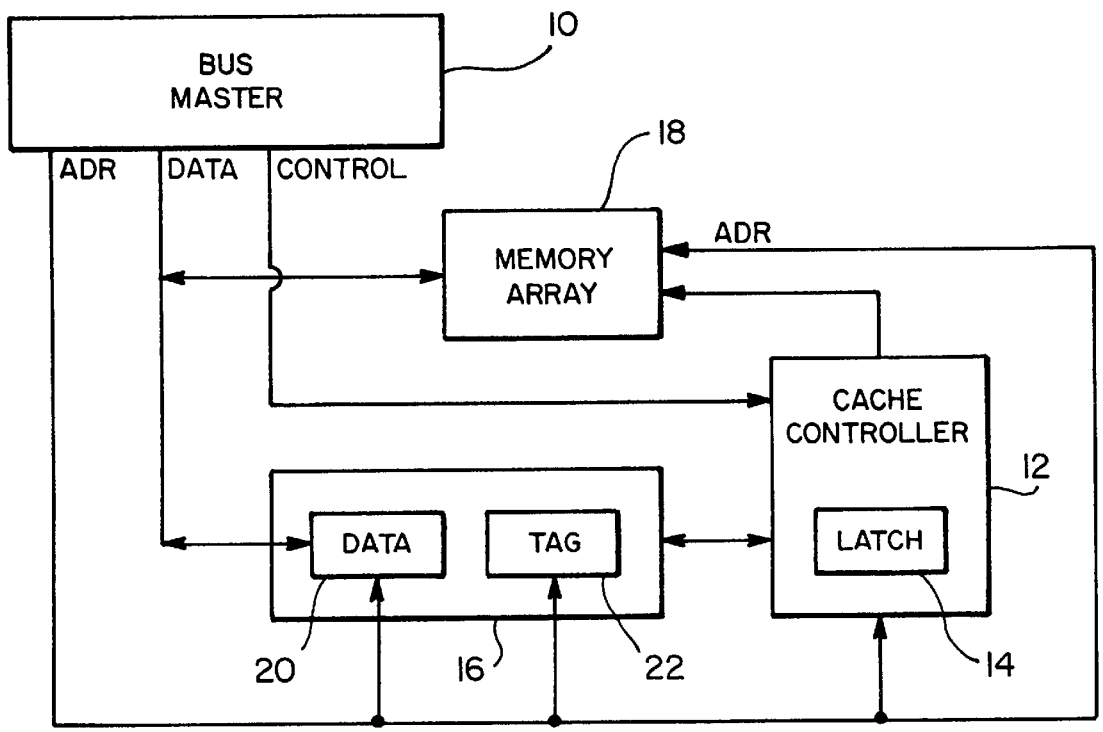
FIG_2

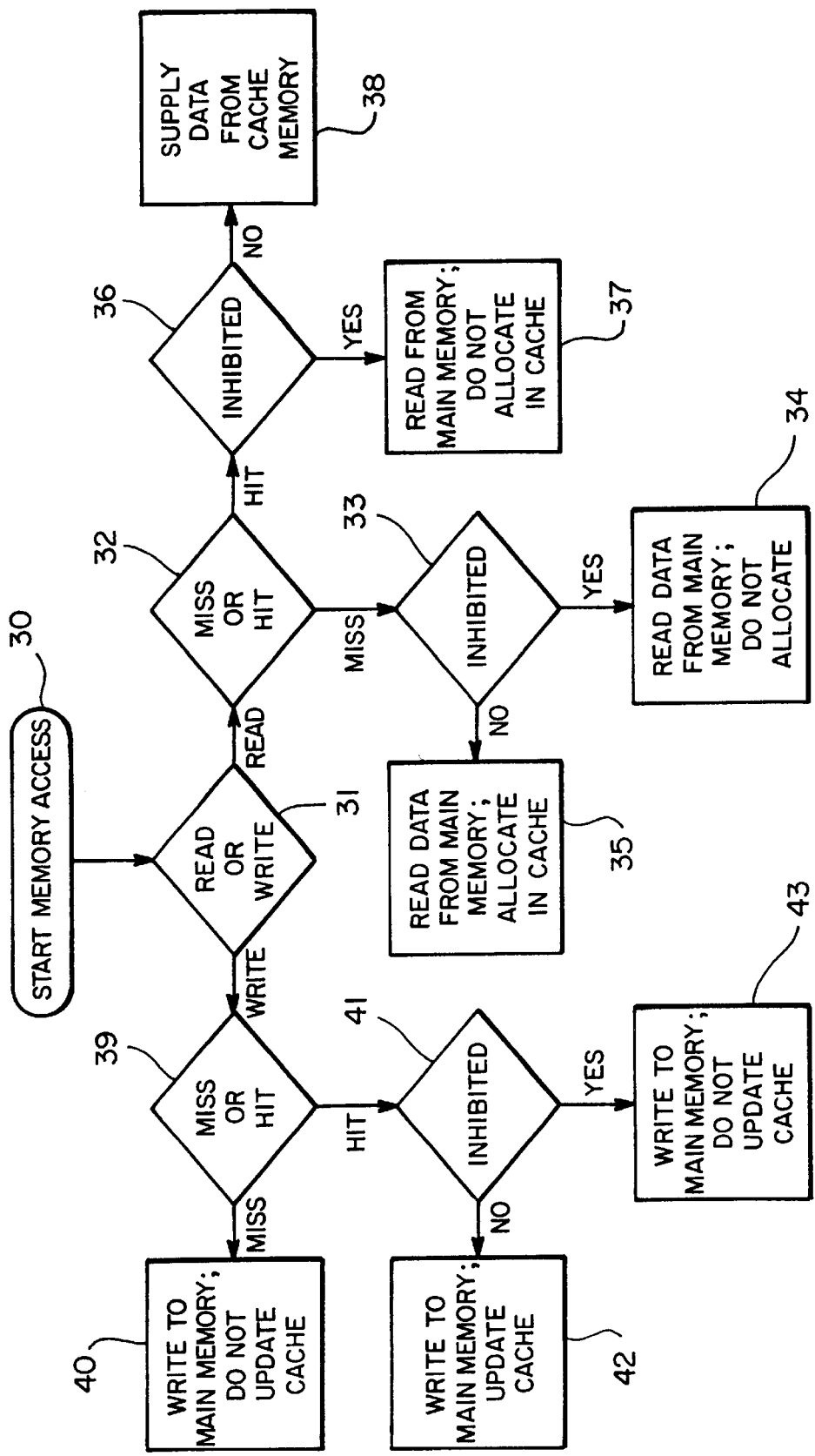
FIG_3 (PRIOR ART)

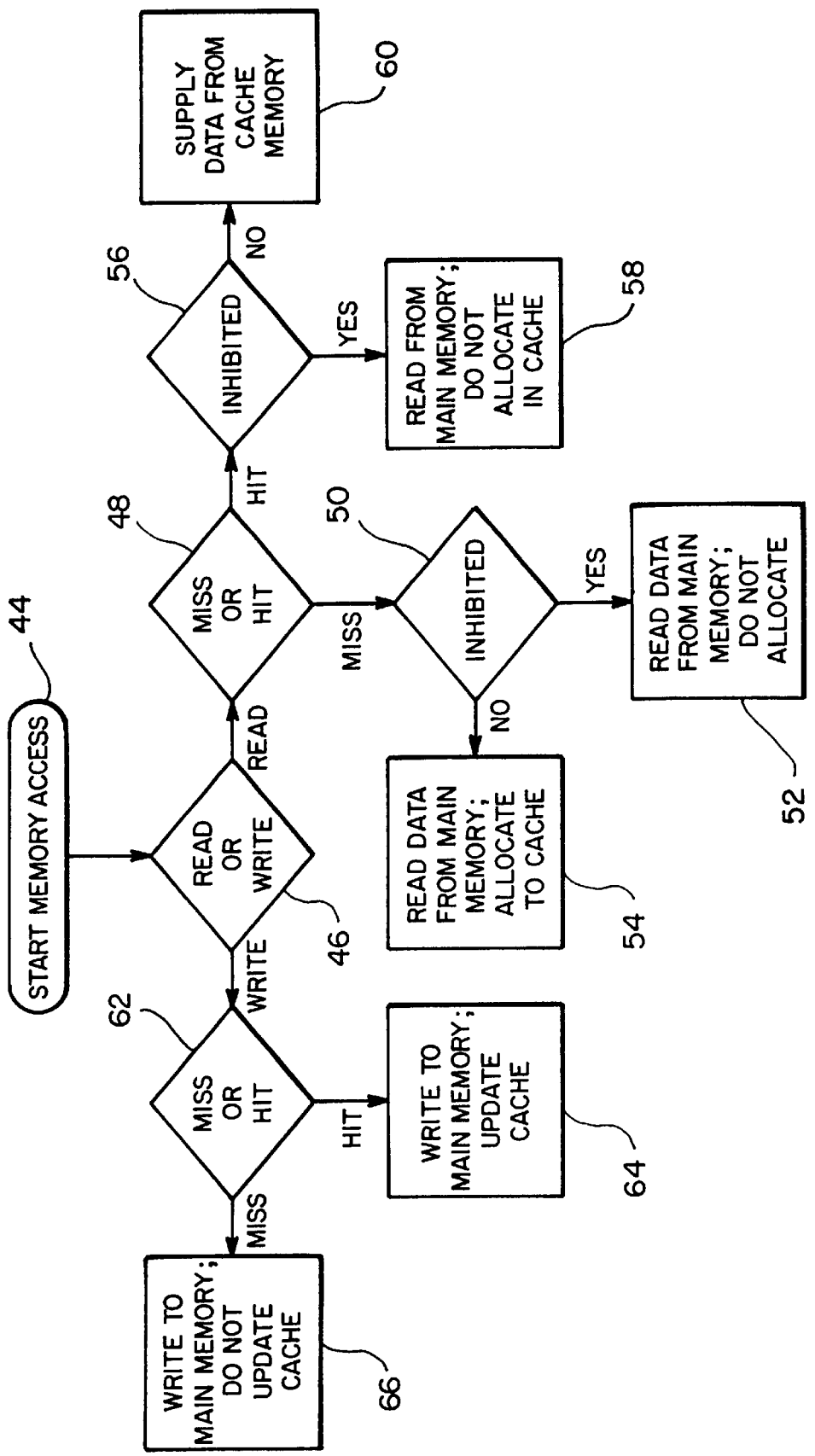
FIG_4

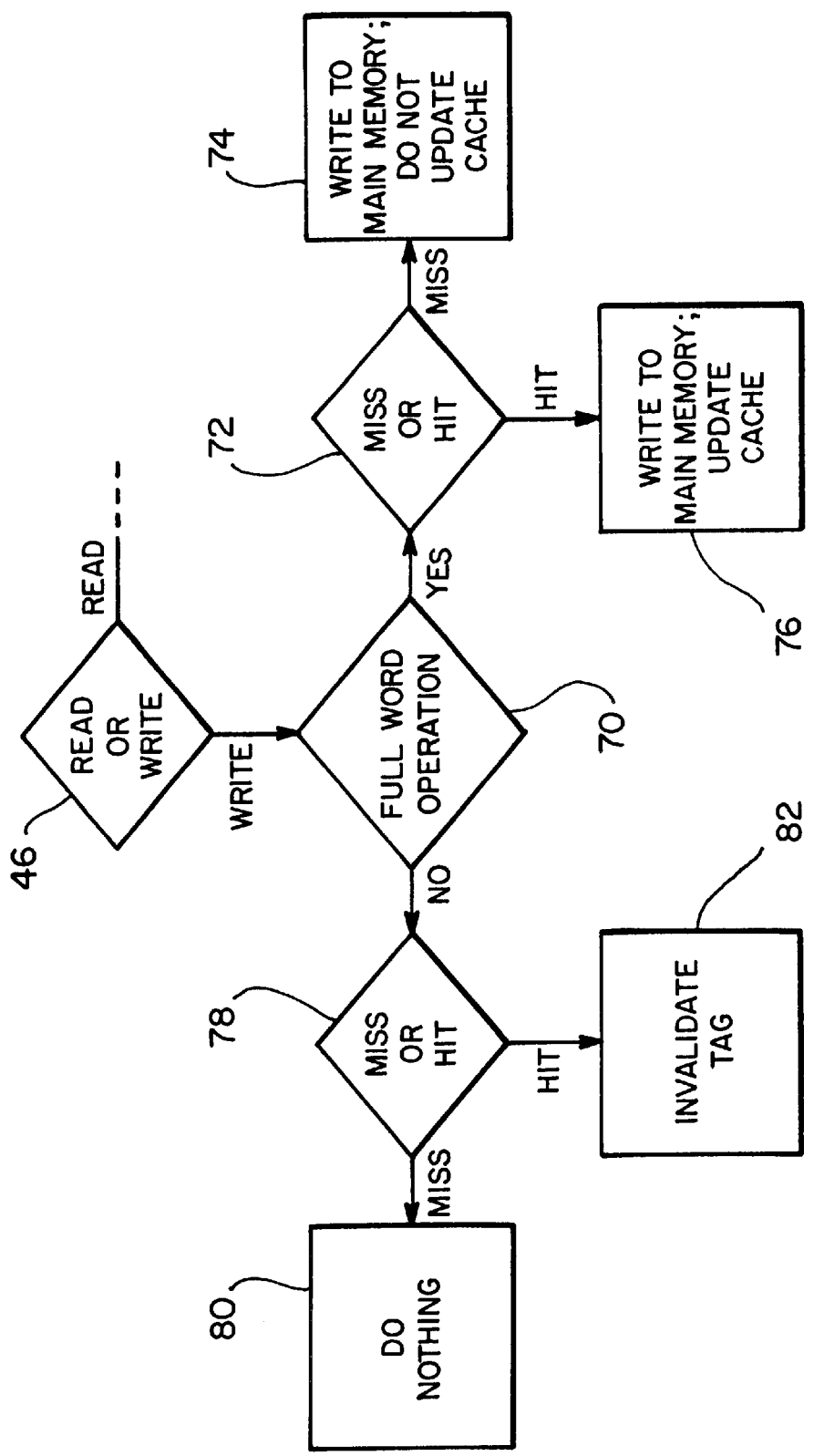
FIG_5

CACHE MANAGEMENT DURING CACHE INHIBITED TRANSACTIONS FOR INCREASING CACHE EFFICIENCY

BACKGROUND

The present invention relates generally to digital computers and, more specifically, to cache memory management in digital computers.

As the performance demands on digital computers continue to increase at a meteoric pace, processors have been developed which operate at higher and higher clock speeds. The instruction sets used to control these processors have been pared down (e.g., RISC architecture) to make them more efficient. Processor improvements alone, however, are insufficient to provide the greater bandwidth required by computer users. The other computer subsystems which support the processor, e.g., I/O devices and memory devices, must also be designed to operate at higher speeds and support greater bandwidth. In addition to improved performance, cost has always been an issue with computer users. Thus, system designers are faced with the dual challenges of improving performance while remaining competitive on a cost basis.

Cache memory systems were designed with these competing goals in mind. If the processor must wait for a memory system to access data, then the memory system becomes a bottleneck and reduces system efficiency. The ready solution of devising and incorporating the fastest possible memory devices for the entire digital computer memory is rather uneconomical due to the large amounts of memory used into today's digital computers and because, typically, the faster the memory device, the greater the cost of that device. Cache memories are essentially high-speed buffers for holding data which provide an interface between the processor and the main memory. By adding a cache memory between a fast processor and a slower (than the cache) memory system, a designer can provide an apparently fast memory at an affordable cost.

This ability of a cache system stems from a general tendency of many programs to access data and program instructions that have been recently accessed or those which are located in nearby memory locations. If the processor needs data that is not resident in the cache, a cache "miss", it accesses the main memory array. The data fetched from the main memory array then replaces some of the data in the cache with the expectation that it will be needed again soon. Properly implemented, the rate at which data is found in the cache, the cache "hit" rate, can be in excess of 90% of all accesses depending upon the type of software and data structures being implemented.

Cache memories are commonly divided into two sections, a data storage section which holds and delivers the data (for example, a high speed storage device such as SRAM) and a tag storage section which stores the corresponding main memory addresses of data stored in the data storage section. When the processor initiates a memory read operation, the processor sends the physical address associated with the memory access to a cache controller which internally latches the address for operation. The cache controller compares the physical address in the internal latch with the tags which are currently stored in the tag storage section. If the cache controller finds a match, then a cache hit has occurred and the corresponding datum is retrieved from the data storage section and forwarded to the processor. If the cache controller does not find a match, then a cache miss has occurred and the corresponding datum is retrieved from main memory, forwarded to the processor and stored in the cache data storage section. Since the cache memory is very fast, cache hits take less time to process than retrieving the data directly from main memory. Cache misses, on the other hand, take longer to process than retrieving data directly from main memory. The additional latency for cache misses is referred to as the miss penalty.

To generalize, memory write operations can occur in two different ways. If the location in memory being written has a corresponding copy in the cache, then the cache updates its copy of the datum. The cache can either concurrently forward the datum to the main memory array (a "write-through" cache) or it can wait until later to update the main memory (a "write-back" or "copy-back" cache). The write-through scheme provides cache coherency with the main memory array, assuming that all memory transactions are handled in the same way, since the data in both the cache and corresponding locations in the main memory will be the same. On the other hand, the copy-back scheme provides some advantages in terms of speed since the number of write operations to the slower main memory is reduced, but a monitoring scheme is needed to resolve cache incoherences.

Many systems also provide for software control over the cache memory. For example, it may be desirable in certain cases to define areas of main memory as being noncacheable. In particular, this may be desirable for areas of memory which are used in ways which do not follow the tendency described above of repeated access to the same or nearby memory locations, i.e., the types of memory accesses which would not benefit from searching the cache memory and which would instead be subject to the miss penalty. An example is main memory areas which are used to hold blocks of data. If these memory areas were cacheable, then reusable instructions might be replaced in the cache by unreusable data, thereby degrading cache performance. The software can control usage of the cache memory by, for example, declaring one or more ranges of addresses in the main memory to be noncacheable. For example, FIG. 1 shows an exemplary memory map wherein blocks 00–1A are cacheable, blocks 1A–1C are noncacheable, and the remaining blocks are cacheable. This memory map can be used by the processor to, for example, set an inhibit bit in a register which is used to control memory access modes. For example, if an address to be asserted on the address bus is found in a noncacheable region of the memory map, then the processor sets the inhibit bit equal to one and the memory access will be completed by referencing that address in the main memory, completely bypassing the cache. Thus, the accessed location is not loaded into the cache (if the access is a write operation) nor is the location allocated in the cache (if the access is a read-miss operation). Similarly, when the cache inhibit bit is set, copies of accessed data currently in the cache are not updated, flushed, or invalidated.

By providing software with the opportunity to define its own regions of noncacheable main memory, cache performance can be optimized by only looking to the cache for ranges of main memory which are relatively more likely to be reaccessed. However, the designation of memory ranges as cacheable or noncacheable can be changed by the software dynamically or, when another program is loaded, a new memory map may be created. When this occurs, the portion of memory which was earlier declared as noncacheable, for example blocks 1A–1C in FIG. 1, may now be declared as cacheable memory. However, the cache controller will have no idea whether or not images within this range which are currently stored in the cache changed while this range of addresses was noncacheable. Accordingly, the cache controller will have to invalidate all the current tag entries for at least this range of addresses and, possibly, the entire cache memory.

SUMMARY

These and other drawbacks and limitations of conventional methods for managing cache memory systems which use cache inhibiting transactions are overcome by selectively disregarding a value of a cache inhibit bit. For example, during memory transactions involving a memory address which has been indicated by a processor to be noncacheable, this indication will be ignored for write operations when there is an image of the data at that address stored in the cache, i.e., for cache write hits. Read operations, however, will be performed in a conventional manner whereby addresses which have been indicated as noncacheable will not be allocated in the cache. In this way, the benefits attributable to allowing the software to designate cache inhibited memory areas are retained, but the cache need not be periodically flushed in response to a redesignation of a memory area as cacheable.

BRIEF DESCRIPTION OF THE DRAWINGS

The foregoing, and other, objects, features and advantages of the present invention will be more readily understood upon reading the following detailed description in conjunction with the drawings in which:

FIG. 1 is a memory map showing portions of memory which are designated as cacheable or noncacheable;

FIG. 2 is a block diagram of a memory system;

FIG. 3 is a flowchart illustrating a conventional method of cache management;

FIG. 4 is a flowchart illustrating a method of cache management according to an exemplary embodiment of the present invention; and FIG. 5 is a flowchart depicting an alternative flow for the write branch of FIG. 4.

DETAILED DESCRIPTION

FIG. 2 depicts a block diagram of an exemplary memory system which can be used to implement the present invention. Of course, those skilled in the art will recognize that other configurations can also be operated in accordance with the principles set forth herein.

In FIG. 2, the various elements of the memory system are interconnected by way of three busses, specifically an address bus, a data bus, and a control bus. The operation of these busses is well known to those skilled in the art and, accordingly, will not be further described herein. A bus master 10 uses these busses to interact with the other elements of the memory system. For example, during memory accesses the bus master 10 asserts an address on the address bus which may then be operated on in the cache controller 12 which internally latches the address in latch 14. The cache controller 12 is associated with both a cache memory 16 and a main memory array 18. The cache memory includes a tag section 20 and data section 22 which store addresses and data corresponding to similar locations in the main memory array for high speed access as described above.

In order to obtain a complete understanding of the present invention, initially a more detailed example of a conventional method for handling cache inhibited transactions will be described with respect to the flowchart of FIG. 3. Therein, at block 30, a memory access begins by, for example, a bus master providing a control signal on the control bus indicating the beginning of a memory cycle. The memory address to be operated upon is also asserted on the address bus by the bus master at his time. Next, at decision block 32, the memory or cache controller checks to see if he address asserted on the address bus has been designated as noncacheable by the us master. This is accomplished by, for example, checking the state of a control line f the control bus dedicated to the cache inhibit bit.

The cache controller first determines whether the memory access is a read or a rite operation at block 31. If the operation is a read, then the flow proceeds to block 32 wherein it is determined if the addressed data can be found in the cache memory. If a cache miss occurs, then the flow proceeds to block 33 wherein it is determined whether the address has been designated cache inhibited, i.e., by checking the state of a dedicated control line. If cache inhibited, then the data is read from main memory and not allocated to the cache at block 34. Otherwise, the data is read from main memory and allocated to the cache when the address is cacheable at block 35.

Returning now to the other branch of decision block 32, if the address has an image in the cache, then it is determined whether or not that address is cache inhibited at block 36. If so, then the information is read from main memory and not allocated in the cache at block 37. When cacheable, the data is supplied from the cache memory at block 38.

Looking again at decision block 31, when the flow proceeds to block 39 for write operations, it is determined if the address asserted on the address bus has a corresponding image in the cache. If not (cache miss), then the flow proceeds to block 40 wherein the information is written to the main memory but without updating the cache. If a cache hit occurs, then the status of the inhibit line is checked at block 41 and the flow proceeds to block 42 for a cacheable transaction where the data is both written to main memory and used to update the cache. For noncacheable write-hit transactions (block 43), the information is written to main memory and not used to update the cache.

The drawback to this conventional cache management method is that since the cache will not be updated during write operations to addresses which are designated by the processor (i.e., by the software) as noncacheable, the cache becomes incoherent with respect to main memory. The conventional solution to this problem is to flush the cache when the noncacheable memory locations later become cacheable which reduces cache efficiency, particularly if the software frequently redesignates memory ranges as cacheable or noncacheable.

This difficulty is solved by way of the present invention, an exemplary embodiment of which will now be described with respect to FIG. 4. In FIG. 4, the flowchart again begins with a memory access initiation at block 44. The cache controller then determines whether the memory access is a read or a write operation at block 46. If the operation is a read, then the flow proceeds to block 48 wherein it is determined whether or not the addressed data can be found in the cache memory. If a cache miss occurs, then the flow proceeds to block 50 wherein it is determined whether or not the address has been designated cache inhibited, i.e., by checking the state of a dedicated control line. If cache inhibited, then the data is read from main memory and not allocated to the cache at block 52. Otherwise, the data is read from main memory and allocated to the cache when the address is cacheable at block 54.

Returning now to the other branch of decision block 48, if the address has an image in the cache, then it is determined whether or not that address is cache inhibited at block 56. If so, then the information is read from main memory and not allocated in the cache at block 58. When cacheable, the data is supplied from the cache memory. Thus, handling of the read transactions is similar to that of the conventional method described with respect to FIG. 3. Next, write operations according to this exemplary embodiment of the present invention will be described.

Looking again at decision block 46, when the flow proceeds to block 62 for write operations, it is determined whether or not the address on the address bus has a corresponding image in the cache. If so, then the flow proceeds to block 64 wherein the information is both written to the main memory and used to update the cache by writing in the data section thereof. Otherwise, the flow proceeds to block 66 wherein the information is written to main memory and not used to update the cache.

Note that the write branch of the flowchart of FIG. 4 is different from the corresponding branch illustrated in the conventional method of FIG. 3. More specifically, note that the processing for write operations is not dependent upon the state of the inhibit line since the cache is updated for cache hits and not updated for cache misses regardless of whether the address is cache inhibited. In this way, the cache remains coherent with main memory even for memory ranges which have been designated as cache inhibited and, the cache need not be flushed when the software dynamically redesignates memory areas from non-cacheable to cacheable.

Other exemplary embodiments of the present invention contemplate support for write operations which act upon less than a full word of data. For example, some systems permit memory operations on a subset of the number of bits which comprise a full word in the system, e.g., each byte of a 64 bit word. Controlling the cache memory to reflect changes made by these types of memory operations can be accomplished in a variety of ways. For example, each subset of a word stored in the cache can be independently changeable. In such an implementation, the word subset can be updated regardless of the cache inhibit status for cache write hits in a manner similar to that described above. Of course controlling each word subset stored in the cache requires a corresponding additional number of control lines used to coordinate cache activities.

Alternatively, however, the cache memory may only support operations on a full word at a time even though the rest of the system supports partial word operations, to avoid the expense of additional control lines. In such implementations, updating the cache with data on the data bus relating to a partial word operation will result in an erroneous image because the bits not involved in the operation are invalid. Thus, in these types of systems the tag representing the entire cache line should be invalidated. This process is illustrated in FIG. 5 wherein the branch beginning with decision block 46 of FIG. 4 is illustrated.

If the operation is a full word operation, then the flow proceeds from block 70 to block 72 wherein misses and hits are handled in block 74 and 76, respectively, in a manner similar to that of FIG. 4. On the other hand, if the transaction operates on less than a full word, the flow moves on to decision block 78, wherein a miss is processed at block 80 with no action by the cache controller. If the address has an image in the cache, then the tag associated with that image is invalidated at block 82 since the image will not longer reflect what is stored in the main memory. As with previous exemplary embodiments, this invalidation can be performed regardless of the cache inhibit status of this memory address to avoid having to later invalidate the entire cache.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for managing a cache memory during a memory operation comprising the steps of:
   receiving an address at a cache controller;
   determining whether said address has been designated as noncacheable;
   if said address has been designated as noncacheable and said memory operation is a read operation, then accessing a main memory to retrieve therefrom; and
   if said address has been designated as noncacheable and said memory operation is a write operation, then accessing said main memory and updating said cache memory.

2. A method for handling a memory write operation comprising the steps of:
   identifying an address associated with said memory write operation as noncacheable; and
   disregarding said noncacheable identification and updating a location in a cache memory with data associated with said memory write operation.

3. A method for handling a memory write operation comprising the steps of:
   identifying an address associated with said memory write operation as noncacheable; and
   disregarding said noncacheable identification and invalidating a tag entry associated with said address in a cache memory.

4. The method of claim 3, wherein said memory write operation acts on a subset of a number of bits which comprise a data word.

5. A cache controller comprising:
   means for determining if an address on an address bus is cache inhibited;
   means for, during a memory read operation, allocating data to a cache memory based upon a result of said determining means; and
   means for, during a memory write operation, updating said cache memory regardless of said result of said determining means.

6. The cache controller of claim 5, wherein said means for updating updates said cache only during full data word write operations.

7. The cache controller of claim 5, wherein said means for updating updates said cache during both full and partial data word write operations.

8. The cache controller of claim 6, further comprising:
   means for, during a partial word memory write operation, invalidating a tag entry associated with said address regardless of said result of said determining means.

9. A cache controller for controlling a cache memory during a memory access comprising:

a first circuit for determining whether the memory access is a read or a write operation;

a second circuit for determining whether the memory access is to an address associated with the cache memory; and a third circuit for determining whether the memory access is to an address that has been designated as noncacheable;

wherein if the first circuit determines that the memory access is a write operation, then the cache controller updates the cache memory based upon the determination of the second circuit and not based upon the determination of the third circuit.

10. The cache controller of claim 9, wherein if the first circuit determines that the memory access is a read operation, then the cache controller updates the cache memory based upon the determination of the second circuit and the third circuit.

* * * * *